(12) United States Patent
Yang (10) Patent No.: US 10,666,073 B2
(45) Date of Patent: May 26, 2020

(54) THIMBLE CONTACT GAMEPAD RECHARGEABLE BATTERY PACKAGE, BATTERY COVER, AND CHARGING DOCK THEREOF

(71) Applicant: Linwei Yang, Guangdong (CN)

(72) Inventor: Linwei Yang, Guangdong (CN)

(73) Assignee: Mingzhi Manufacturing (Hong Kong) Co., Ltd., Zhongshan, Guangdong (CN)

( * ) Notice: Subject to any disclaimer, the term of this patent is extended or adjusted under 35 U.S.C. 154(b) by 0 days.

(21) Appl. No.: 16/168,775

(22) Filed: Oct. 23, 2018

(65) Prior Publication Data

US 2020/0091745 A1 Mar. 19, 2020

(30) Foreign Application Priority Data

Sep. 15, 2018 (CN) ..................... 2018 2 1508582 U (51) Int. Cl.
| | | |
|---|---|---|
| *H02J 7/00* | (2006.01) | |
| *A63F 13/00* | (2014.01) | |
| *H01M 2/04* | (2006.01) | |
| *A63F 13/92* | (2014.01) | |
| *A63F 13/235* | (2014.01) | |

(52) U.S. Cl.
CPC .......... *H02J 7/0045* (2013.01); *A63F 13/235* (2014.09); *A63F 13/92* (2014.09); *H01M 2/0404* (2013.01); *H02J 7/0047* (2013.01)

(58) Field of Classification Search
CPC ............................. A63F 13/235; H02J 7/0045

USPC ......................................................... 320/114
See application file for complete search history.

(56) References Cited

U.S. PATENT DOCUMENTS

| | | | | |
|---|---|---|---|---|
| 5,874,723 A | * | 2/1999 | Hasegawa et al. .. | G06K 7/0008 235/439 |
| 8,093,864 B2 | * | 1/2012 | Wright ................... | G08C 17/02 320/114 |
| 8,378,630 B2 | * | 2/2013 | Navid .................... | H01R 31/06 320/113 |
| 8,633,675 B2 | * | 1/2014 | Navid .................... | H01R 31/06 320/113 |
| 9,757,649 B2 | * | 9/2017 | Townley et al. ........ | A63F 13/20 |
| 10,155,170 B2 | * | 12/2018 | Ikeda et al. ............ | A63F 13/24 |
| 2008/0007212 A1 | * | 1/2008 | Theytaz et al. ........ | H02J 7/0013 320/107 |

(Continued)

*Primary Examiner* — Sun J Lin (57) ABSTRACT

The disclosure enclosed herein discloses a gamepad, the gamepad comprising: a thimble contact rechargeable battery package, a battery cover, and a charging dock, wherein the dock comprises an upper cover, a bottom shell, and a charging PCB arranged between them. The disclosure has a dual-charge dock charging for two gamepads simultaneously, with two thimbles. A battery groove is at a back of the gamepad, and a battery cover matching the battery groove is provided therein, and also has a charging window. The rechargeable battery package has a charging interface and a discharging interface. When in use, the rechargeable battery package is placed into the battery groove and covered. The discharging interface is electrically connected to the gamepad, supplying power thereto. When being charged, the gamepad is placed on the charging dock; the thimble arranged at the charging dock contacts with the charging interface through the charging window to realize charging.

10 Claims, 7 Drawing Sheets

(56) References Cited

U.S. PATENT DOCUMENTS

2009/0054145 A1* 2/2009 Yang et al. ............. A63F 13/06
                                                                463/37

* cited by examiner

THIMBLE CONTACT GAMEPAD RECHARGEABLE BATTERY PACKAGE, BATTERY COVER, AND CHARGING DOCK THEREOF

BACKGROUND OF THE INVENTION

Field of the Invention

The disclosure relates to the technical field of game device and in particular, to thimble contact gamepad rechargeable battery package, battery cover, and charging dock thereof.

Description of the Related Art

With the fiery of e-sports, more and more people are participating in it, and e-sports devices are constantly being updated. In order to facilitate the operation of the players, many wired gamepad are now evolved into the current wireless gamepad. As for the charging endurance of the wireless gamepad, most prior sockets adopt the plug-in type structure, that is, when being charged, the plug of the gamepad is required to be inserted into the socket, or the plug of the socket is inserted into the charging port of the gamepad. When using the plug-in type socket, frequent inserting and removing are required, which not only easily wears the plug of the gamepad, but also damages the structure of the socket itself. In order to ensure the reliability of electrical contact between the plug-in type plug and the charging dock, the plug and the socket are usually arranged compactly, which makes the plug inconvenient to be inserted and removed. The user needs to pull out the plug with great effort, which is very inconvenient and will reduce the service life of the gamepad and the charging dock. Accordingly, designing a contact type charging device is an urgent problem to be solved by those skilled in the relevant art.

SUMMARY OF THE INVENTION

To resolve the technical issues above, the disclosure provides a technical solution: thimble contact gamepad rechargeable battery package, battery cover, and charging dock thereof, comprising a rechargeable battery package, a battery cover, and a charging dock, wherein the charging dock comprises a charging dock upper cover, a charging dock bottom shell, and a charging PCB arranged between the charging dock upper cover and the charging dock bottom shell; the charging dock upper cover and the charging dock bottom shell are connected to form an enclosed space; the charging dock upper cover comprises a status displaying block arranged at the middle portion; between two ends of the charging dock upper cover and the bottom of the status displaying block is provided with a charging groove respectively; the surface of the charging groove is provided with a charging port; the charging port is protruded with a charging thimble electrically connected to the charging PCB; the top of the status displaying block is provided with a status displaying port; the status displaying port is protruded with a two-color LED indicator electrically connected to the charging PCB;

the rechargeable battery package is arranged in the battery groove on the back of the gamepad and is provided with a charging interface and a discharging interface connected to the internal cell of the rechargeable battery package, wherein the charging interface is arranged at two ends of the rechargeable battery package to supply power to the gamepad, and the discharging port is arranged at one side of the rechargeable battery package away from the gamepad; the rechargeable battery package is outside provided with a battery cover connected to the rechargeable battery package and the battery groove on the back of the gamepad, wherein the battery cover is provided with a charging window corresponding to the charging port, so that when the gamepad is placed at the charging dock, the charging thimble passes through the charging window to contact with the charging interface, so as to charge the rechargeable battery package.

Further, the charging groove is symmetrically arranged at two sides of the status displaying block, and the charging groove is an arcuate groove adapted to the shape of the bottom surface of the gamepad so that the gamepad can be laid flat into the charging groove.

Further, the charging dock bottom shell is inside provided with a PCB mounting board, and the PCB is arranged thereon; the PCB mounting board is connected to the inner surface of the charging dock bottom shell through fixing pieces.

Further, the fixing pieces comprise a bottom frame pair arranged along the length of the charging dock; two ends of the bottom frame pair is respectively provided with a fixing piece 1 and a fixing piece 2, and two sides of the bottom frame pair are respectively provided with a fixing piece 3 and a fixing piece 4; two ends of the PCB mounting board are fixed between the fixing piece 1 and the fixing piece 2, and two sides thereof are provided with a mounting groove corresponding to the fixing piece 3 and the fixing piece 4.

Further, the fixing piece 1, the fixing piece 2, and the fixing piece 3 have the same structure; the fixing piece 1 comprises a central column, and two sides thereof are respectively provided with a side panel connected to the bottom frame pair; the fixing piece 4 is a fixing block connected to the inner wall of the charging dock, and the fixing block is provided with a power input port connected to the PCB.

Further, between the bottom frame pairs are provided with several fixing columns, and the PCB mounting board is provided with fixing holes corresponding to the fixing columns.

Further, the PCB comprises a HJM1691A control module, a power module for supplying power to the HJM1691A control module, a charging indicating module connected to the HJM1691A control module, a switch module connected to the HJM1691A control module and the power module, and an output module connected to the switch module.

Further, the output module is a charging thimble arranged on the PCB, and the charging indicating module is a two-color LED indicator arranged on the PCB for indicating the status of charge.

Further, the upper portion of the charging port is provided with a charging thimble mount, and the charging thimble is fixed therein.

Further, the end of the charging groove away from the status displaying block is upwardly provided with a limiting part, and the end of the charging groove proximal to the limiting part is provided with a placing groove at both sides.

After adopting the above structure, the disclosure has the following advantages: the disclosure discards the plug-in type contact method and adopts the thimble type contact method. When in use, the gamepad is only required to be placed on the socket, then it is charged by the contact of the thimble and the charging port arranged at the gamepad, so that the gamepad does not required to be inserted and removed when being charged with the socket, thereby the wear of the gamepad with the socket is reduced and is convenient to be inserted and removed.

The disclosure has a dual-charge charging dock that can charge for two gamepads at the same time, and the charging dock is provided with two charging thimbles. A battery groove is provided at the back of the gamepad, and a battery cover matching the battery groove is provided therein, and the battery cover is provided with a charging window. The rechargeable battery package adopts different interfaces when being charged and discharged, that is, the rechargeable battery package is provided with a charging interface and a discharging interface. When in use, the rechargeable battery package is placed into the battery groove and is covered by the battery cover. The charging window of the battery cover is directly opposite to the charging interface, and the discharging interface of the battery is electrically connected to the gamepad, so as to supply power to the gamepad. When being charged, the gamepad is placed on the charging dock; the charging thimble arranged at the charging dock is in contact with the charging interface of the rechargeable battery package through the charging window to realize the charging process.

In the figures, 1 refers to the rechargeable battery package; 1.1 refers to the charging interface; 1.2 refers to the discharging interface; 2 refers to the battery cover; 2.1 refers to the charging window; 3 refers to the charging dock; 3.1 refers to the charging dock upper cover; 3.1a refers to the status displaying block; 3.1b refers to the charging groove; 3.1b1 refers to the limiting part; 3.1b2 refers to the placing groove; 3.1c refers to the charging port; 3.1d refers to the status displaying port; 3.2 refers to the charging dock bottom shell; 3.3 refers to the charging PCB; 3.4 refers to the charging thimble; 3.5 refers to the two-color LED indicator; 3.6 refers to the PCB mounting board; 3.6a refers to the mounting groove; 3.6b refers to the fixing hole; 3.7 refers to fixing pieces; 3.7a refers to the bottom frame pair; 3.7b refers to the fixing piece 1; 3.7b1 refers to the central column; 3.7b2 refers to the side panel; 3.7c refers to the fixing piece 2; 3.7d refers to the fixing piece 3; 3.7e refers to the fixing piece 4; 3.8 refers to the power input port; 3.9 refers to the fixing column.

DETAILED DESCRIPTION OF THE PREFERRED EMBODIMENTS

Figure 1:
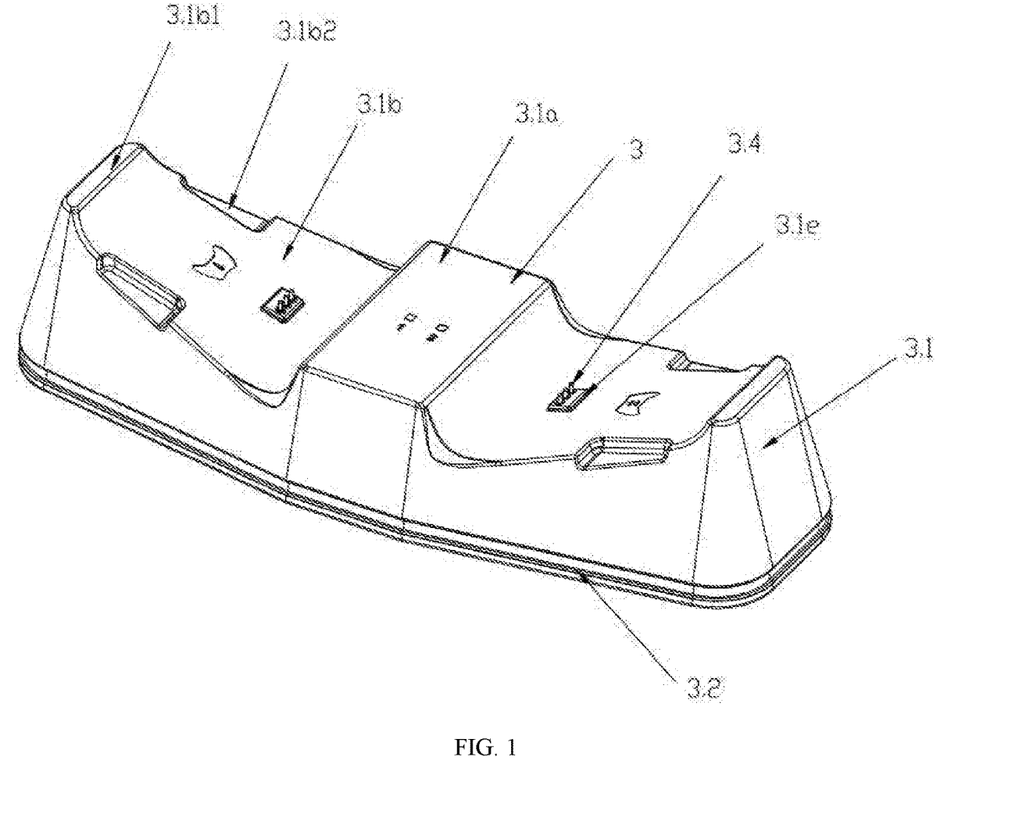
FIG. 1 is the structural diagram illustrating the charging dock of the thimble contact gamepad rechargeable battery package, battery cover, and charging dock thereof in the disclosure.
Figure 2:
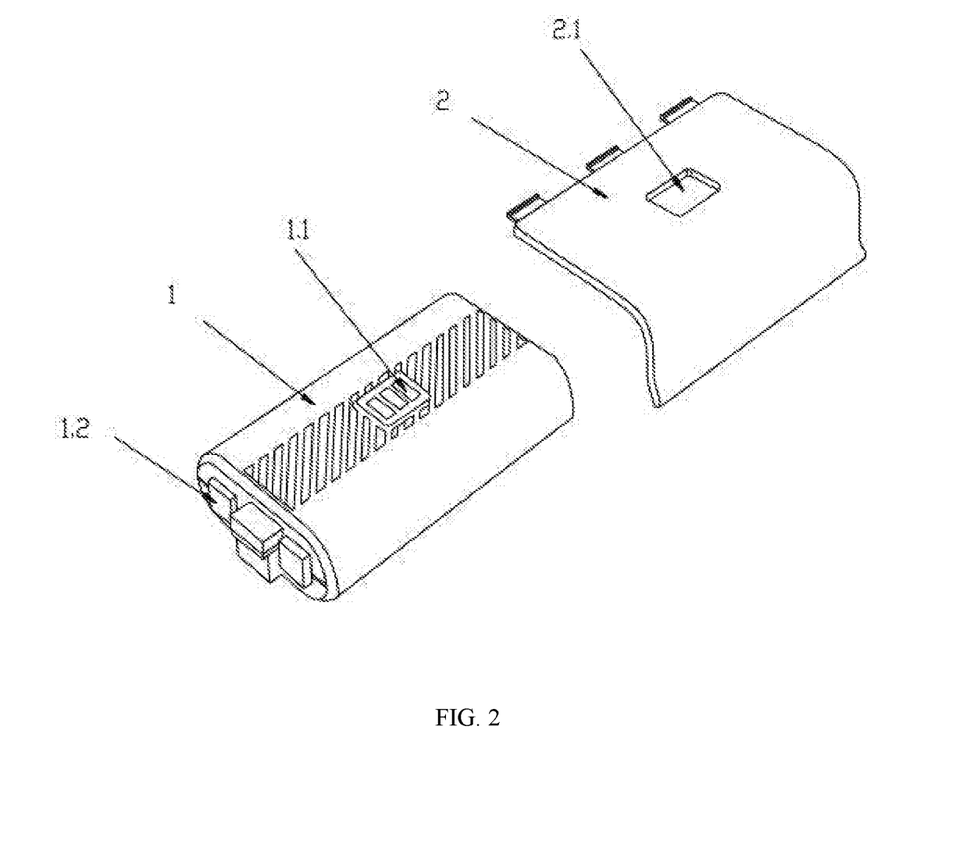
FIG. 2 is the structural diagram illustrating the rechargeable battery package and the battery cover of the thimble contact gamepad rechargeable battery package, battery cover, and charging dock thereof in the disclosure.

With reference to FIG. 1-7, thimble contact gamepad rechargeable battery package, battery cover, and charging dock thereof, comprising a rechargeable battery package 1, a battery cover 2, and a charging dock 3, wherein the charging dock 3 comprises a charging dock upper cover 3.1, a charging dock bottom shell 3.2, and a charging PCB 3.3 arranged between the charging dock upper cover 3.1 and the charging dock bottom shell 3.2; the charging dock upper cover 3.1 and the charging dock bottom shell 3.2 are connected to form an enclosed space; the charging dock upper cover 3.1 comprises a status displaying block 3.1a arranged at the middle portion; between two ends of the charging dock upper cover 3.1 and the bottom of the status displaying block 3.1a is provided with a charging groove 3.1b respectively; the surface of the charging groove 3.1b is provided with a charging port 3.1c; the charging port 3.1c is protruded with a charging thimble 3.4 electrically connected to the charging PCB 3.3; the top of the status displaying block 3.1a is provided with a status displaying port 3.1d; the status displaying port 3.1d is protruded with a two-color LED indicator 3.5 electrically connected to the charging PCB 3.3;

the rechargeable battery package 1 is arranged in the battery groove on the back of the gamepad and is provided with a charging interface 1.1 and a discharging interface 1.2 connected to the internal cell of the rechargeable battery package 1, wherein the charging interface 1.2 is arranged at two ends of the rechargeable battery package 1 to supply power to the gamepad, and the discharging interface 1.1 is arranged at one side of the rechargeable battery package 1 away from the gamepad; the rechargeable battery package 1 is outside provided with a battery cover 2 connected to the rechargeable battery package 1 and the battery groove on the back of the gamepad, wherein the battery cover 2 is provided with a charging window 2.1 corresponding to the charging port 1.1, so that when the gamepad is placed at the charging dock 3, the charging thimble 3.4 passes through the charging window 2.1 to contact with the charging interface 1.1, so as to charge the rechargeable battery package 1.

As a preferred solution of the embodiment, the charging groove is symmetrically arranged at two sides of the status displaying block, and the charging groove 3.1b is an arcuate groove adapted to the shape of the bottom surface of the gamepad so that the gamepad can be laid flat into the charging groove 3.1b.

Figure 3:
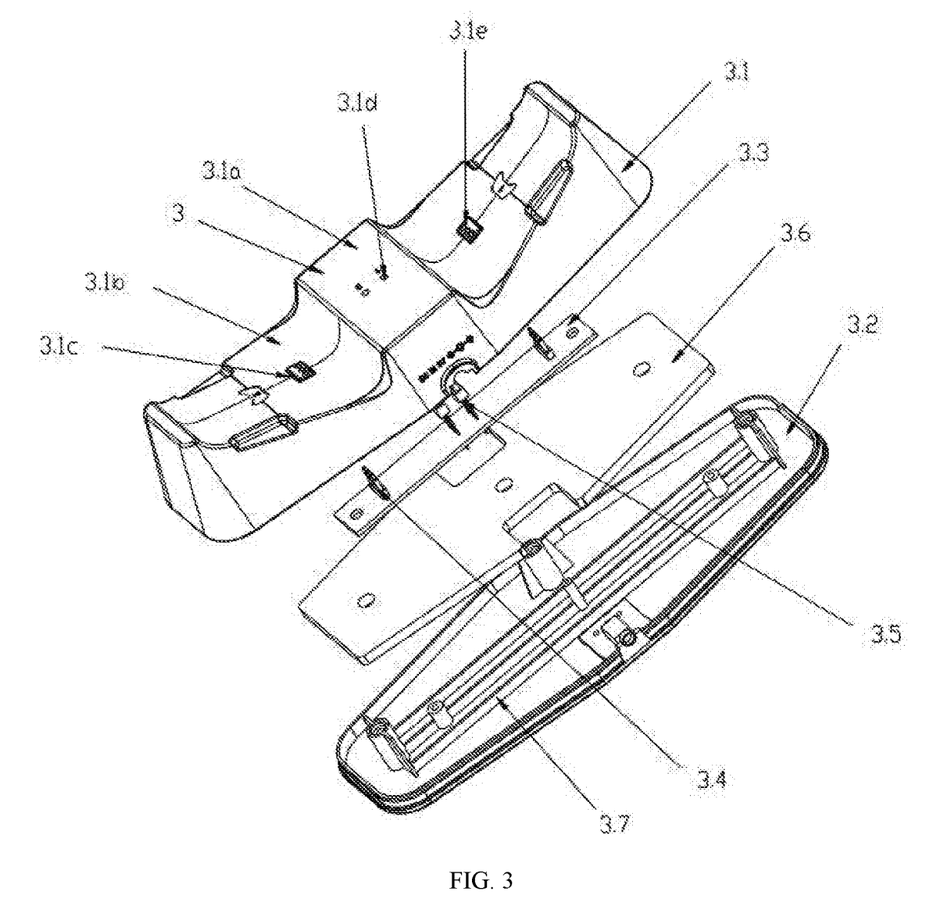
FIG. 3 is the split structural diagram illustrating the charging dock of the thimble contact gamepad rechargeable battery package, battery cover, and charging dock thereof in the disclosure.
Figure 4:
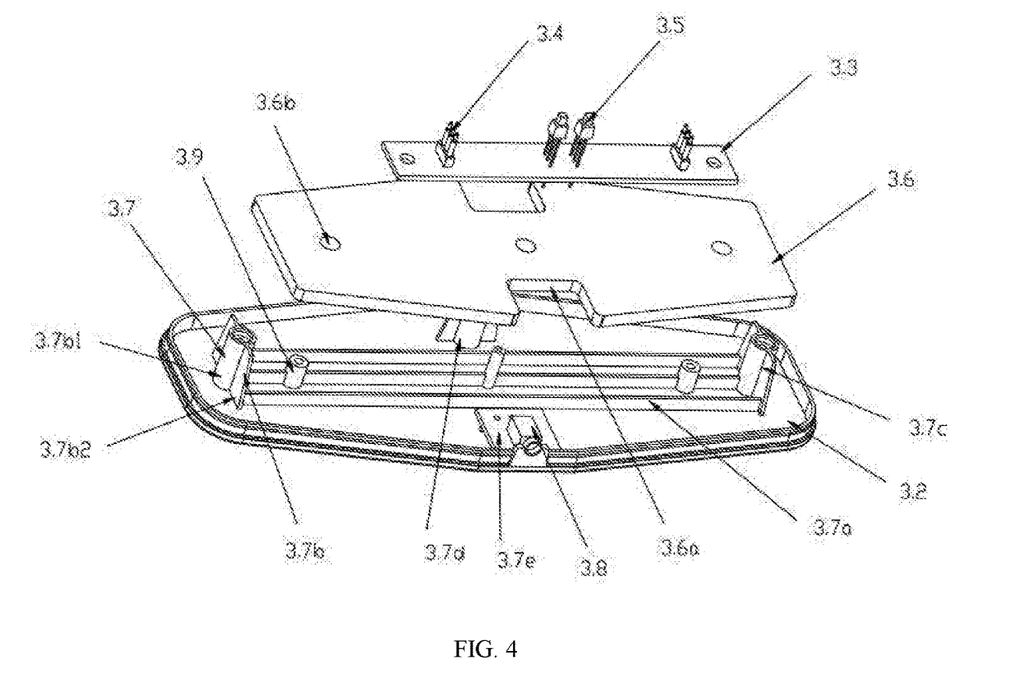
FIG. 4 is the split structural diagram illustrating the charging dock bottom shell of the thimble contact gamepad rechargeable battery package, battery cover, and charging dock thereof in the disclosure.

As a preferred solution of the embodiment, the charging dock bottom shell 3.2 is inside provided with a PCB mounting board 3.6, and the PCB 3.3 is arranged thereon; the PCB mounting board 3.6 is connected to the inner surface of the charging dock bottom shell 3.2 through fixing pieces 3.7.

As a preferred solution of the embodiment, the fixing pieces 3.7 comprise a bottom frame pair 3.7a arranged along the length of the charging dock 3; two ends of the bottom frame pair 3.7a are respectively provided with a fixing piece 1 3.7b and a fixing piece 2 3.7c, and two sides of the bottom frame pair 3.7a are respectively provided with a fixing piece 3 3.7d and a fixing piece 4 3.7e; two ends of the PCB mounting board 3.6 are fixed between the fixing piece 1 3.7b and the fixing piece 2 3.7c, and two sides thereof are provided with a mounting groove 3.6a corresponding to the fixing piece 3 3.7d and the fixing piece 4 3.7e.

As a preferred solution of the embodiment, the fixing piece 1 3.7b, the fixing piece 2 3.7c, and the fixing piece 3 3.7d have the same structure; the fixing piece 1 3.7b comprises a central column 3.7b1, and two sides thereof are respectively provided with a side panel 3.7b2 connected to the bottom frame pair 3.7a; the fixing piece 4 3.7e is a fixing block connected to the inner wall of the charging dock 3, and the fixing block is provided with a power input port 3.8 connected to the PCB 3.3.

As a preferred solution of the embodiment, between the bottom frame pairs 3.7a are provided with several fixing columns 3.9, and the PCB mounting board 3.6 is provided with fixing holes 3.6b corresponding to the fixing columns 3.9.

Figure 6:
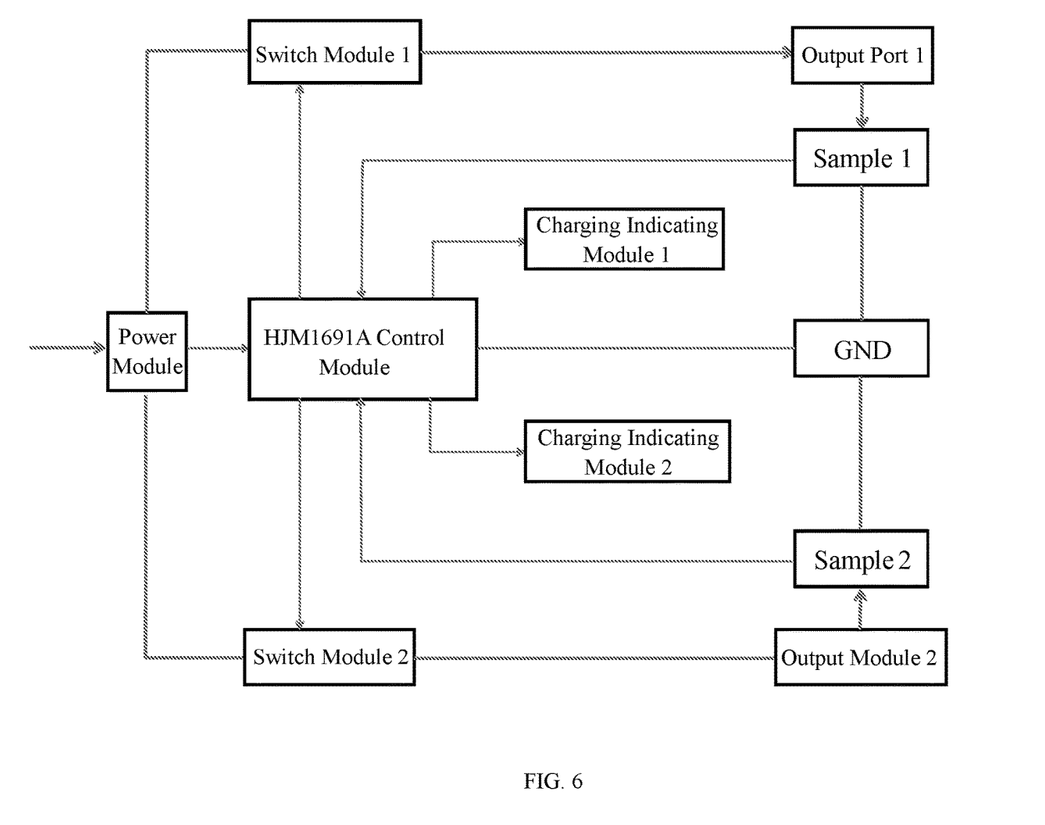
FIG. 6 is the systematic structural diagram illustrating the thimble contact gamepad rechargeable battery package, battery cover, and charging dock thereof in the disclosure.
Figure 7:
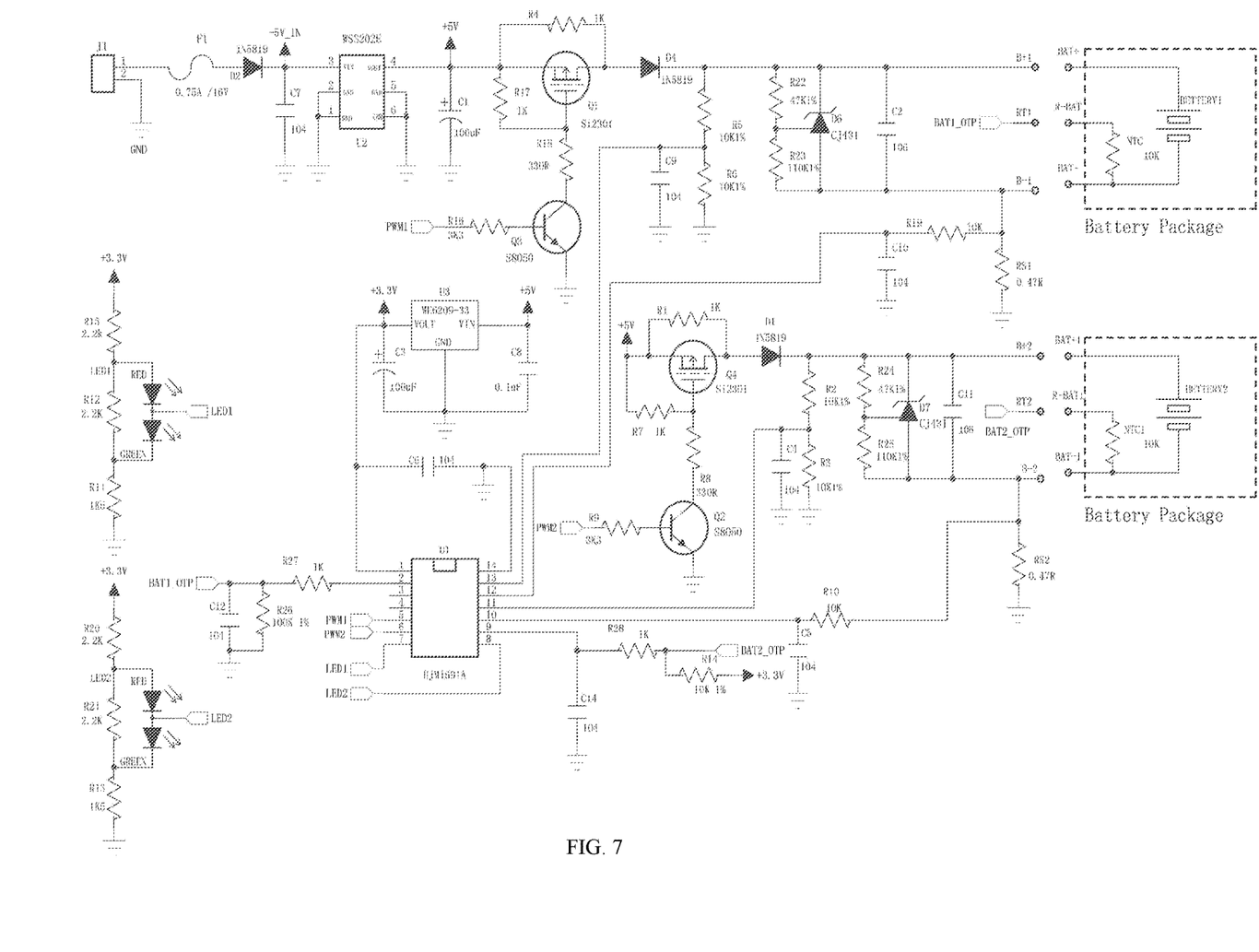
FIG. 7 is the circuit structural diagram illustrating the thimble contact gamepad rechargeable battery package, battery cover, and charging dock thereof in the disclosure.

As a preferred solution of the embodiment, the PCB 3.3 comprises a HJM1691A control module, a power module for supplying power to the HJM1691A control module, a charging indicating module connected to the HJM1691A control module, a switch module connected to the HJM1691A control module and the power module, and an output module connected to the switch module.

As a preferred solution of the embodiment, the output module is a charging thimble 3.4 arranged on the PCB 3.3, and the charging indicating module is a two-color LED indicator 3.5 arranged on the PCB 3.3 for indicating the status of charge.

Figure 5:
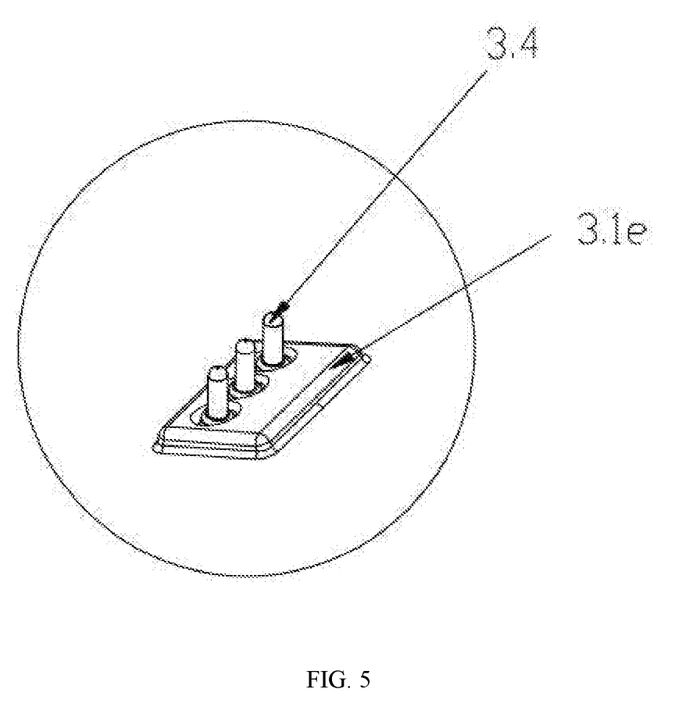
FIG. 5 id the magnified structural diagram illustrating the charging thimble of the thimble contact gamepad rechargeable battery package, battery cover, and charging dock thereof in the disclosure.

As a preferred solution of the embodiment, the upper portion of the charging port 3.1c is provided with a charging thimble mount 3.1e, and the charging thimble 3.4 is fixed therein.

As a preferred solution of the embodiment, the end of the charging groove 3.1b away from the status displaying block 3.1a is upwardly provided with a limiting part 3.1b1, and the end of the charging groove 3.1b proximal to the limiting part 3.1b1 is provided with a placing groove 3.1b2 at both sides.

The power module comprises a DC 5V input, overcurrent protection (connected by a fuse F1 and an overvoltage protection current limiting tube WS3202E), reverse-connection preventing protection (connected by a fuse F1 and a diode IN5819), and overvoltage protection (an overvoltage protection current limiting tube WS3202E) that are connected to the DC 5V input, and supply power respectively to the two charging switch modules, and the other charging switch module supplies power to the control module HJM1691A after the voltage stabilization of ME6209.

The switch module is connected by a triode 8050 and a switch tube SI2301, and the charging current (flowing to the battery) is adjusted and turned on and off by a control signal provided by the control module.

In addition, the charging current flows through the Jepsun Sampling Resistor (0.47R) to form a voltage drop, and the voltage drop is fed back to the control module for processing.

The charging dock 3 is dual-charged that can charge for two gamepads at the same time, and the charging dock 3 is provided with two charging thimbles 3.4. A battery groove is provided at the back of the gamepad, and a battery cover 2 matching the battery groove is provided therein, and the battery cover 2 is provided with a charging window 3.1c. The rechargeable battery package 1 adopts different interfaces when being charged and discharged, that is, the rechargeable battery package 1 is provided with a charging interface 1.1 and a discharging interface 1.2. When in use, the rechargeable battery package 1 is placed into the battery groove and is covered by the battery cover 2. The charging window 3.1c of the battery cover 2 is directly opposite to the charging interface 1.1, and the discharging interface 1.2 of the battery is electrically connected to the gamepad, so as to supply power to the gamepad. When being charged, the gamepad is placed on the charging dock 3; the charging thimble 3.4 arranged at the charging dock 3 is in contact with the charging interface 1.1 of the rechargeable battery package 1 through the charging window 2.1 to realize the charging process.

The disclosure and its embodiments have been described above, and the description is not limited thereto. What is shown in the drawings is only one of the embodiments of the disclosure, and the actual structure is not limited thereto. In general, if those of ordinary skill in the art are inspired by it, without departing from the object of the disclosure, the structural methods and embodiments similar to this technical solution without creative design shall fall within the protection scope of the disclosure.

What is claimed is:

1. A gamepad, comprising: a thimble contact rechargeable battery package, a battery cover, and a charging dock, wherein the charging dock comprises a charging dock upper cover, a charging dock bottom shell, and a charging printed circuit board (PCB) arranged between the charging dock upper cover and the charging dock bottom shell; the charging dock upper cover and the charging dock bottom shell are connected to form an enclosed space; the charging dock upper cover comprises a status displaying block arranged at a middle portion of the enclosed space; between two ends of the charging dock upper cover and the bottom of the status displaying block are provided with a charging groove, respectively; a surface of the charging groove is provided with a charging port; the charging port is protruded with a charging thimble electrically connected to the charging PCB; a top of the status displaying block is provided with a status displaying port; the status displaying port is protruded with a two-color light omitting diode (LED) indicator electrically connected to the charging PCB;

the rechargeable battery package is arranged in a battery groove on a back of the gamepad and is provided with a charging interface and a discharging interface connected to an internal cell of the rechargeable battery package, wherein the charging interface is arranged at two ends of the rechargeable battery package to supply power to the gamepad, and the discharging interface is arranged at one side of the rechargeable battery package away from the gamepad; the rechargeable battery package is provided outside the battery groove with a battery cover connected to the rechargeable battery package and the battery groove on the back of the gamepad, wherein the battery cover is provided with a charging window corresponding to the charging port, so that when the gamepad is placed at the charging dock, the charging thimble passes through the charging window to contact with the charging interface, so as to charge the rechargeable battery package.

2. The gamepad of claim 1, wherein the charging grooves are symmetrically arranged at two sides of the status displaying block, and each charging groove of said charging grooves is an arcuate groove adapted to a shape of a bottom surface of the gamepad so that the gamepad can be laid flat into said each charging groove.

3. The gamepad of claim 1, wherein the charging dock bottom shell is provided with a PCB mounting board, and the charging PCB is arranged thereon; the PCB mounting board is connected to an inner surface of the charging dock bottom shell through fixing pieces.

4. The gamepad of claim 3, wherein the fixing pieces comprise a bottom frame pair arranged along a length of the charging dock; two ends of the bottom frame pair are respectively provided with a fixing piece 1 and a fixing piece 2, and two sides of the bottom frame pair are respectively provided with a fixing piece 3 and a fixing piece 4; two ends of the PCB mounting board are fixed between the fixing piece 1 and the fixing piece 2, and two sides thereof are provided with a mounting groove corresponding to the fixing piece 3 and the fixing piece 4.

5. The gamepad of claim 4, wherein the fixing piece 1, the fixing piece 2, and the fixing piece 3 have a same structure; the fixing piece 1 comprises a central column, and two sides thereof are respectively provided with a side panel connected to the bottom frame pair; the fixing piece 4 is a fixing block connected to an inner wall of the charging dock, and the fixing block is provided with a power input port connected to the charging PCB.

6. The gamepad of claim 4, wherein between bottom frames of the bottom frame pair are provided with fixing columns, and the PCB mounting board is provided with fixing holes corresponding to said several, fixing columns.

7. The gamepad of claim 1, wherein the charging PCB comprises a HJM1691A control module, a power module for supplying power to the HJM1691A control module, a charging indicating module connected to the HJA41691A control module, a switch module connected to the HJM1691A control module and the power module, and an output module connected to the switch module.

8. The gamepad of claim 7, wherein the output module is a charging thimble arranged on the charging PCB, and the charging indicating module is a two-color LED indicator arranged on the charging PCB for indicating a status of charge.

9. The gamepad of claim 1, wherein an upper portion of the charging port is provided with a charging thimble mount, and the charging thimble is fixed therein.

10. The gamepad of claim 1, wherein an end of the charging groove away from the status displaying block is upwardly provided with a limiting part, and the end of the charging groove proximal to the limiting part is provided with a placing groove at both sides.

\* \* \* \* \*